June 4, 1968 T. C. STOCKEBRAND 3,387,293

BIDIRECTIONAL RETRIEVAL OF MAGNETICALLY RECORDED DATA

Filed Nov. 9, 1964 4 Sheets-Sheet 1

INVENTOR
THOMAS C. STOCKEBRAND
BY Blair & Buckles
ATTORNEYS

BIDIRECTIONAL RETRIEVAL OF MAGNETICALLY RECORDED DATA

Filed Nov. 9, 1964

INVENTOR
THOMAS C. STOCKEBRAND
BY
Blair & Buckles
ATTORNEYS

| CONTENTS OF SHIFT REGISTER 46 | | | | | | | | CONTROL SIGNAL OUTPUT FROM DECODER 48 |
|---|---|---|---|---|---|---|---|---|
| SHIFT REGISTER STAGES | | | | | | | | |
| 46h | 46g | 46f | 46e | 46d | 46c | 46b | 46a | |
| 0 | 1 | 1 | 0 | 1 | 1 | 0 | 1 | TAPE END |
| 1 | 1 | 1 | 0 | 1 | 0 | 0 | 1 | GUARD |
| 0 | 1 | 0 | 1 | 0 | 1 | 1 | 0 | BLOCK |
| X | X* | 1 | 1 | 1 | 0 | 1 | 1 | BLOCK END |
| X | 0 | 0 | 0 | 1 | 0 | 0 | 0 | BLOCK SHIFT |
| 0 | 1 | 1 | 1 | 1 | 0 | 0 | 0 | DATA |

*X- EITHER A(1) OR A(0) SATISFIES CONDITION

FIG. 3

INVENTOR.
THOMAS C. STOCKEBRAND
BY
Blair & Buckles
ATTORNEYS

BIDIRECTIONAL RETRIEVAL OF MAGNETICALLY RECORDED DATA

Filed Nov. 9, 1964 4 Sheets-Sheet 4

| | COLUMN 1 | | COLUMN 2 | COLUMN 3 | |
|---|---|---|---|---|---|
| | LAST TWO DIGITS OF PRECEDING MARK | FORWARD MARK | COMPLEMENT OF COLUMN 3 / OBVERSE | REVERSE MARK | FIRST TWO DIGITS OF SUCCEEDING MARK |
| ROW 1 | REVERSE BLOCK 01<br>01 TAPE END | TAPE END<br>1 0 1 1 0 1 | 01<br>1 0 1 1 0 1<br>01 | REVERSE TAPE END<br>0 1 0 0 1 0 | BLOCK 01<br>01 REVERSE TAPE END |
| ROW 2 | DATA 00<br>00 BLOCK START | DATA<br>1 1 1 0 0 0 | 00<br>1 1 1 0 0 0<br>00 | DATA<br>1 1 1 0 0 0 | DATA 11<br>11 BLOCK END |
| ROW 3 | REVERE BLOCK 01 | FORWARD BLOCK<br>0 1 0 1 1 0 | 01 0 1 0 1 1 0 | REVERSE BLOCK<br>1 0 0 1 0 1 | FORWARD BLOCK<br>01 |
| ROW 4 | BLOCK END 11 | FORWARD GUARD<br>1 0 1 0 0 1 | 11 1 0 1 0 0 1 | REVERSE GUARD<br>0 1 1 0 1 0 | BLOCK START 00 |
| ROW 5 | REVERSE GUARD 10<br>00 BLOCK START | BLOCK START<br>0 0 1 0 0 0 | 10<br>0 0 1 0 0 0<br>00 | BLOCK END<br>1 1 1 0 1 1 | GUARD 10<br>11 BLOCK END |

FIG. 4

INVENTOR.
THOMAS C. STOCKEBRAND
BY
Blair & Buckles
ATTORNEYS

United States Patent Office 3,387,293

Patented June 4, 1968

3,387,293

BIDIRECTIONAL RETRIEVAL OF MAGNETICALLY RECORDED DATA

Thomas C. Stockebrand, West Acton, Mass., assignor to Digital Equipment Corporation, Maynard, Mass.

Filed Nov. 9, 1964, Ser. No. 409,913
15 Claims. (Cl. 340—174.1)

ABSTRACT OF THE DISCLOSURE

A digital data storage system uses one or more mark tracks, in addition to the usual information tracks, for carrying selected digital control words to designate identification and data storage spaces or "blocks" of digital information on a movable recording medium. The identification control words are located in corresponding positions at the beginning and end of each block and have the property that the signal produced by reading one of them when the medium is moving in one direction is identical with the signal produced by the corresponding word when the medium is moving in the opposite direction. This provides equal facility of identification during motion in either direction. The data control words are located beside each data group in the block and are selected to provide the same signal when they are read in either direction so that data groups may readily be identified and distinguished from identification groups.

This invention relates to the storage of digital data on a moving record medium. More particularly, it provides rapid and flexible access to the data storage spaces on such a record medium.

The invention achieves this objective with a novel method and apparatus for producing and utilizing mark signals that continuously inform data processing control equipment when data storage spaces of the moving storage medium are disposed to receive data for storage and, alternatively, to have data read from them.

The mark signals are produced from mark information recorded on the storage medium in positions corresponding to the data storage spaces. The mark information is recorded and processed in a novel manner that makes possible a relatively flexible and simple storage system that is accurate and reliable and has high speed.

The invention is useful with data storage media such as drums, tapes and disks, using magnetic, optical or other storage techniques. For simplicity, the invention will be described principally with reference to a magnetic tape.

The data stored on a magnetic tape are often organized into blocks encompassing a number of consecutive storage spaces. These spaces are arranged in parallel data tracks extending along the tape. The location of each block is recorded on the tape in a mark track separate from the data tracks.

With this arrangement, as the magnetic tape advances, a mark track read/write transducer produces signals identifying the blocks moving into a read/write position with the data transducers. These signals are used to schedule the retrieval of information recorded in the tape and, alternatively, the recording of information.

The format of the information recorded on the mark track and the manner in which this information is processed to produce the mark signals can simplify the logic circuits and programming, increase the data handling speed, and increase the operating accuracy and reliability of the data processing system to which the storage equipment is connected.

Accordingly, it is an object of the present invention to provide an improved method and apparatus for producing and utilizing mark signals useful for the machine storage and retrieval of digital data.

A further object of the invention is to provide a mark signal producing method and apparatus that are reliable and logically efficient.

It is also an object of the invention to provide a mark signal producing method and apparatus that are flexible and convenient to use.

A further object of the invention is to provide a mark signal producing method and apparatus capable of locating individual word locations on a moving data storage medium.

The object of the invention further includes the provision of a mark signal producing method and apparatus automatically operable with a data storage medium that moves in either of two opposite directions.

Another object of the invention is to provide a mark signal-producing method of the above character which can be implemented with relatively simple circuitry.

Other objects of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which:

FIG. 3 is a chart summarizing the operation of the decoder in the apparatus of FIG. 2; and FIG. 4 is a chart relating to the illustrated mark words.

Figure 1:
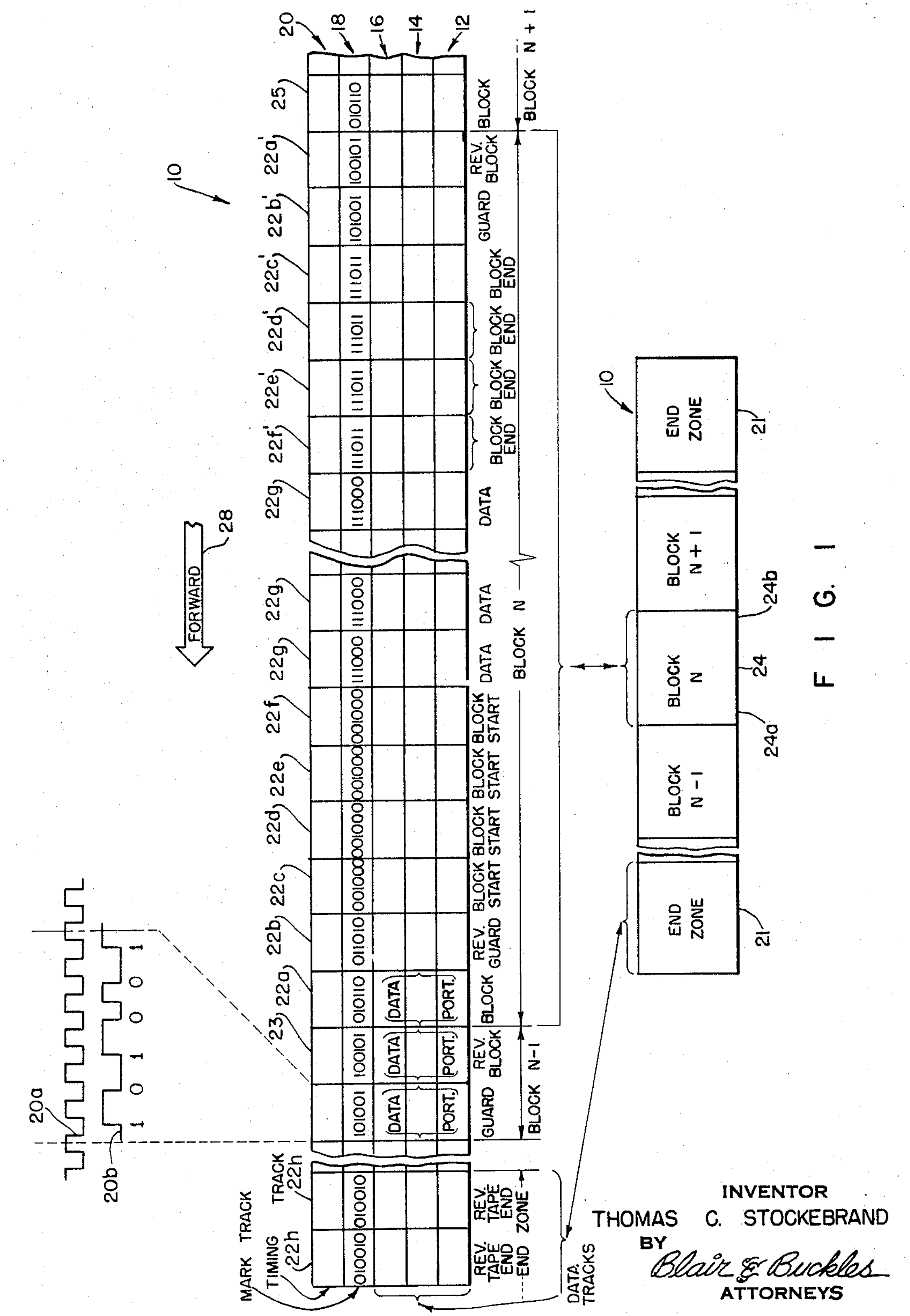
FIG. 1 is a pictorial representation of magnetic tape having pre-recorded timing and mark tracks in accordance with the invention.

According to the invention, a multiple-track magnetic tape is organized into blocks containing a number of smaller segments termed "frames." Each frame, in turn, encompasses in each track a number of "slots," or spaces along the tape for storing single binary digits.

Binary-coded mark words are recorded on the tape in a mark track. The recorded mark track words demarcate successive blocks along the tape and individual frames within a block. The mark words also identify the kind of information recorded in the frames. Decoding apparatus processes the mark signals developed by reading the mark track and produces control signals that schedule the transfer of data to and from the recording tape.

In addition to the mark track, the illustrated embodiment of the invention utilizes a timing track recorded on the tape to produce timing pulses selectively phased with respect to the mark signals. The timing pulses and the mark signals are used to produce further control signals termed instruction signals.

Most frames in each block are used to store data that is to be processed. Therefore, a "data mark" is recorded in the mark track in each such frame. In addition, control frames containing control information are provided at each end of the blocks. In these frames, the mark track has "control marks" recorded in it.

Still another mark word, termed a "tape end mark," is recorded on the mark track in the frames at each end of the tape to signal that an end of the tape has been reached.

In accordance with a further feature of the invention, each control frame at one end of a block corresponds with a control frame at the other end of a block. The control marks in the corresponding frames are so selected that the signal produced from reading the mark word recorded in one frame when the tape moves in the forward direction is identical to the signal produced by reading the corresponding frame when the tape moves in the reverse direction. That is, when the tape is read in the forward direction, a selected mark signal is read from the mark track of a certain control frame. When the tape is read in the opposite, reverse direction, the corresponding control frame produces exactly the same mark signal as it did in the forward direction.

As a result of this feature, the magnetic tape can be run forward and backward at will, with the mark track continually producing the same mark signals that describe the frames passing the read/write transducers. This bidirectional operation simplifies the logic of data processing system and reduces its operating time.

The embodiment of the invention described below records information on the tape with the conventional phase-modulated technique wherein a flux reversal of a particular direction indicates a binary ZERO, while a flux reversal in the opposite direction indicates a binary ONE. With this recording technique, also referred to as Manchester polarity sensed recording, the bidirectional operation mentioned above is achieved by having the control marks in corresponding control frames be the complement obverses of each other. The complement obverse of a number is the complement of the number with the digits read in the reverse direction. Thus, in the binary system used in digital magnetic tape recording 010110 is the complement obverse of 100101, and again 001000 is the complement observe of 111011.

Turning now to FIG. 1, the invention will be described with reference to storing digital data on a magnetic tape, fragments of which are indicated generally at 10, having three data tracks 12, 14 and 16, a mark track 18, and a timing track 20.

The purpose of the timing track 20 is to produce pulses for synchronizing equipment such as a tape controller with movement of the tape 10. In the illustrated system the timing track 20 produces two timing pulses when the tape advances by the width of one slot, i.e. by a distance along the tape for storing a single digit. Thus, two consecutive timing pulses demarcate each data slot. The idealized waveform 20*a* at the top of FIG. 1 illustrates a flux pattern appropriate for such a timing track using the polarity modulated recording technique mentioned above. The illustrated timing track is recorded in quadrature phase with the digits in the mark track and data track. That is, the flux reversals for the digits stored in the mark and data tracks occur in the interval midway between consecutive flux reversals of the timing track. This is illustrated in FIG. 1 with the relation between the mark track idealized flux reversal waveform 20*b* and the timing track waveform 20*a*.

As also shown in FIG. 1, end zones 21 are at the ends of the tape 10. Between the end zones the tape is organized into blocks such as the block 24 and further organized into a plurality of frames 22. The length of each frame in the illustrated embodiment is six slots so that the data portion in each frame, i.e. the storage space per frame provided in the three data tracks 12, 14 and 16, comprises 18 slots.

Turning to the details of the illustrated block 24, it has six control frames 22*a*–22*f* at its forward end 24*a* and a like number of control frames 22*a'*–22*f'* at its reverse end 24*b*. Information in the term of "control marks" is recorded in the mark track 18 in the control frames.

As noted above, each control frame at one end of each block corresponds with a similarly positioned control frame at the other end of the block. Thus, the first frame 22*a* at the forward end 24*a* of block 24 corresponds to the last frame 22*a'* located at the reverse end 24*b* of block 24. Recorded in the mark track in the frames 22*a* and 22*a'* are the control marks 010110 and 100101, respectively. These control marks are the complement obverses of each other, since if we read the control mark in frame 22*a* backwards replacing every 0 with a 1 and every 1 with a 0, we obtain the control mark in frame 22*a'*.

As labelled in FIG. 1 the control frames 22*a* and 22*a'* are referred to respectively as a "block" frame and a "reverse block" frame. The words in their portions of the mark track 18 are referred to as "block" marks. The data portion of each of these block frames contains the binary number (N) that identifies the specific block that these block frames demarcate.

Thus, when the tape 10 moves in the forward direction, i.e. in the direction of arrow 28, as the block frame 22*a* passes under the read/write transducer for the mark track 18, the transducer develops a sequence of pulses that are decoded as described hereinafter to produce a control signal termed a block signal. This signal indicates that the first frame of a new block has passed the read/write transducers. The binary number identifying the block 24 is simultaneously read from the data portion of frame 22*a*.

With the illustrated program, in addition to the block frame 22*a*, the control frames at the block end 24*a* comprises a "reverse guard" frame 22*b*, and four "block start" frames 22*c*, 22*d*, 22*e* and 22*f*. The control mark recorded in the mark track 18 for the frame 22*b* is 011010. The block start control marks 001000 is recorded in the mark track in each of the frames 22*c*–22*f*.

Correspondingly, in addition to the reverse block frame 22*a'*, a "guard" frame 22*b'* and four "block end" frames 22*c'*, 22*d'*, 22*e'* and 22*f'* are also at the block end 24*b*. The control marks recorded in the mark track 18 in these frames 22*b'*–22*f'* are the complement obverses of the control marks recorded in the corresponding frames 22*b*–22*f*.

"Data" frames 22*g* constitute the remainder, and by far the largest number, of frames in the block 24. The same data mark 111000 is written in the mark track 18 in each of these frames. The data tracks 12, 14 and 16 of these frames contain the data stored on the tape 10. It should be noted that the data mark is the complement obverse of itself, so that when the tape is run in either direction, the identical signal, termed the "data" signal, results from reading the mark track in each data frame.

With further reference to FIG. 1, each tape end zone 21 comprises a number of "tape end" frames. The reverse tape end frames 22*h* are shown at the left end of the detailed view. Recorded in the mark track in these frames 22*h* is the reverse tape end mark 010010. The forward tape end mark recorded at the other end of the tape 10 (not shown in the detailed view) is the complement obverse of this mark, or 101101. Notice that the tape end marks have a repetitive format such that each time the tape advances by three data slots, the last six digits read in the end zone 21 constitute another tape end mark. The end marks are decoded as detailed below to produce tape end signals.

In the control frames that have control information written in their data portions, generally the same item of control information is in corresponding control frames within each block. Moreover, in one of two corresponding control frames this data portion control information is recorded as the complement obverse of the information recorded in the other of the two corresponding frames.

For example, the block number (N) is recorded in the data portion of the block frame 22*a* (FIG. 1). The same number is written in the corresponding frame 22*a'*. However, recorded in each data track 12, 14 and 16 in the frame 22*a'* is the complement obverse of the sequence of digits recorded in the same data track in the frame 22*a*.

The information in the timing track 20 and in the mark track 18 is generally pre-recorded on the tape 10 and considered permanent. So also is the block number written in the data portion of the block frames 22*a* and 22*a'* of every block.

Figure 2:
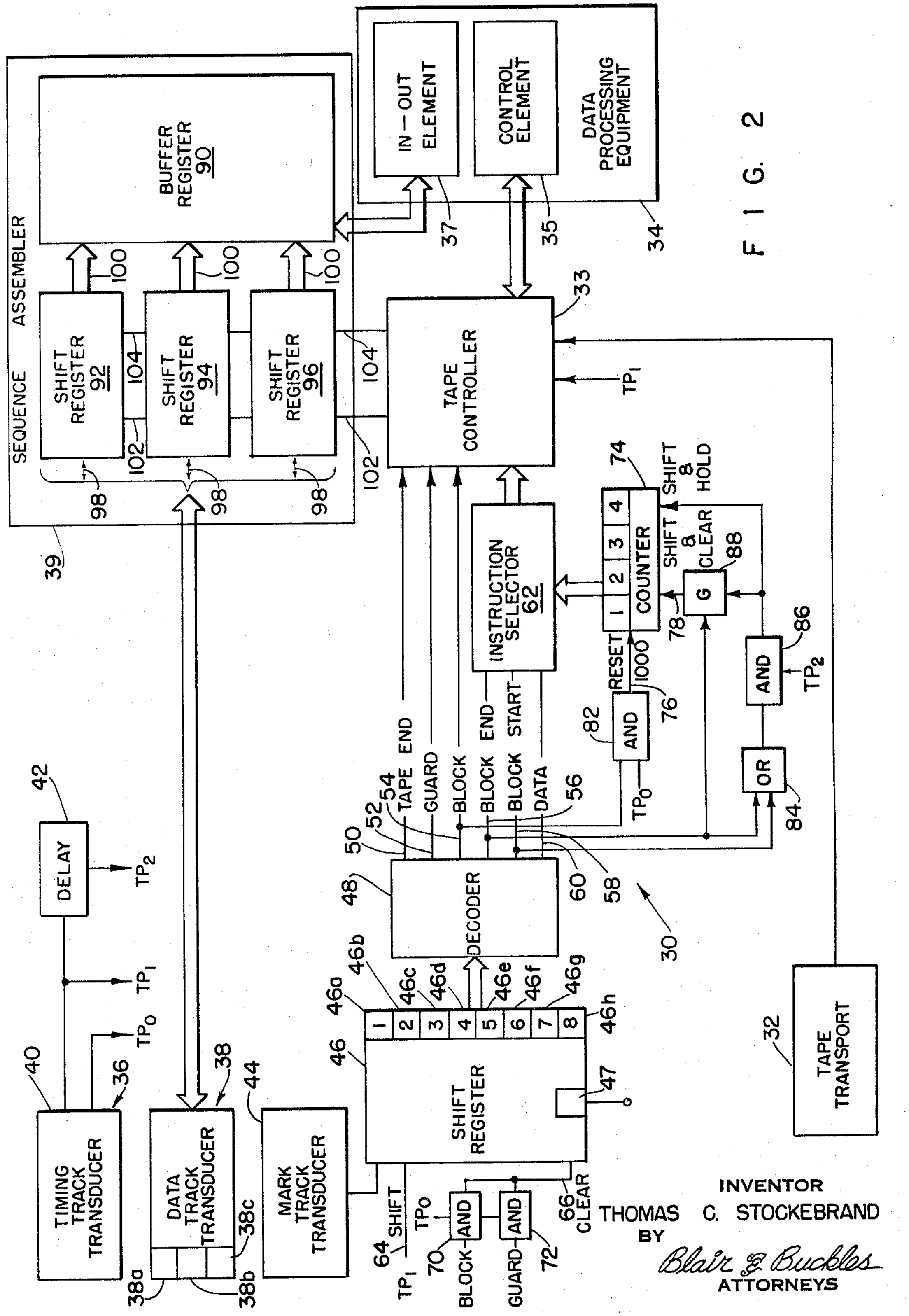
FIG. 2 is a schematic block diagram of mark signal decoding and data transfer apparatus embodying the invention.

Turning now to FIG. 2, a tape transport 32 moves the magnetic tape 10 of FIG. 1 in response to signals it receives from a tape controller 33. Data processing equipment indicated at 34 has a control element 35 that receives information from the tape controller regarding the position of the tape.

A mark track decoder indicated generally at 30 delivers to the tape controller 33 the mark and instruction signals it develops in response to the information read from the mark track of the tape.

As also shown in FIG. 2, a timing unit indicated generally at 36 develops a sequence of timing pulses from the timing track of the tape.

A data transducer unit 38 comprising three read/write transducers 38*a*, 38*b* and 38*c* reads the data recorded in the data tracks and delivers the resultant digital signals to a sequence assembler 39. As discussed in detail below, this equipment manipulates the data read from and delivered to the tape according to the direction in which the tape is moving, i.e. forward or reverse, to transfer information between the data processing equipment 34 and the tape with the correct digit sequence. The timing unit 36 comprises a tape read/write transducer 40 reading the timing track 20 of the tape 10, FIG. 1, and producing two timing pulses, designated TP0 and TP1, each time the tape travels the width of one slot. Each of these pulses is developed in response to a flux reversal in the timing track, and thus they are synchronized with the rate at which the tape is moving. A delay circuit 42 receives the TP1 timing pulses, and, in response thereto, produces a further timing pulse TP2 in each interval between successive TP1 and TP0 pulses.

In the illustrated mark track decoder 30, a mark track transducer 44 reading the mark track 18 of the magnetic tape applies its output signals to a shift register 46. As discussed more fully below, the shift register applies the most recent eight digits it has received to a decoder 48. The eight digits encompass the six-digit length of each mark word, and also two extra digits for the purpose of enhancing accuracy, two additional digits. When the decoder 48 thus receives the series of digits corresponding to a mark word, it develops the corresponding control signal at one of its output terminals 50–60.

Thus, the tape end signals, the guard signals and the block signals are developed at the decoder output terminals 50, 52, and 54, respectively. These terminals are connected to the tape controller 33. The decoder 48 develops the remaining control signals, i.e., block end, block start and data, at its terminals 56–60, which are connected to an instruction selector 62.

More specifically, the illustrated shift register 46 has eight stages 46*a*–46*h* and shifts its contents by one stage, in the direction of the stage 46*h*, in response to each timing pulse TP1 applied to the shift input terminal 64. The binary signals from the mark track transducer 44 enter the shift register at the stage 46*a*.

Preferably, the signals from two coincidence or AND circuits 70 and 72 clear the shift register 46. The output terminals of the AND circuits 70, 72 are together connected to the shift register clear input terminal 66 so that an output signal from either AND circuit clears the shift register.

One input signal to the AND circuit 70 is the block signal developed at the decoder 48 output terminal 54. One input signal to the other AND circuit 72 is the guard signal developed at the decoder output terminal 52. The other input signal for each AND circuit is the timing pulse TP0. Thus, the shift register 46 is cleared in response to the coincidence of the timing pulse TP0 and either the block signal or the guard signal.

The shift register 46 also has a ninth stage 47 connected to the output of the eighth stage 46*h*. It is arranged so that only binary ONES shift from stage 46*h* to stage 47. Thus, when a binary ZERO is in stage 46*h* and a timing pulse TP1 is delivered to the shift terminal 64, the digit stored in stage 47 remains unchanged even though stage 46*h* receives the binary digit formerly in stage 46*g*.

As a result of this arrangement, after the shift register 46 is cleared, i.e. all stages placed in the ZERO condition, the shift register stage 47 contains a binary ZERO until a binary ONE is shifted into it from stage 46*h*. Thereafter, regardless of the contents in stage 46*h*, stage 47 retains the binary ONE until the shift register is again cleared.

With the illustrated mark track words, the stage 47 will contain a ONE except when the mark and guard signals are being produced at the decoder output terminals. The signal output from the stage 47 can therefore be used to disable and, alternatively, enable other logic circuits only during the time when the mark and guard signals are being read from the tape. For example, a ZERO in the stage 47 can be used to inhibit the decoder 48 from sensing the contents of shift register 46 until a ONE is shifted into the stage 47.

As noted above, the decoder 48 senses the contents of the eight shift register stages 46*a*–46*h*. When the binary digits in these stages constitute a mark word plus the last two binary digits of the preceding mark, the decoder develops the control signal corresponding to that word.

For example, referring to FIGS. 1 and 2, when the tape 10 moves in the direction of arrow 28 and the reverse block frame 23 of the block ($N-1$) passes under the mark track transducer 44, followed by the block frame 22*a* of the succeeding block (N), the content of the shift register 46, read in order starting with the contents of stage 46*h*, is 01010110. The first two digits in this series are the last two digits of the mark word recorded in the reverse block frame of block ($N-1$). The remaining six digits are the mark word recorded in the mark track of the block (N) frame 22*a*. When the decoder 48 senses this information in the shift register, it develops the block signal at its terminal 54.

Consider next the reverse tape movement, with the block frame 25 of block ($N+1$), FIG. 1, passing under the mark track transducer followed by the reverse block frame 22*a'* of the succeeding block (N). Due to the use of complement obverse marks in corresponding control frames, the contents of the eight shift register stages 46*a*–46*h* will be the same as set forth above for the forward movement of the forward block frame 22*a* under the read/write transducer. Hence, the decoder 46 again develops the block signal at its output terminal 54.

Thus, regardless of the direction in which the tape moves, as the first frame in a block, i.e., the block frame 22*a* or reverse block frame 22*a'*, passes the mark track transducer, the shift register 46 receives the same sequence of digits from the transducer 44 and applies them to the decoder 48. In response, the decoder develops the block signal.

The chart of FIG. 3 summarizes this operation of the decoder 48 to produce the block signal. The contents of the shift register 46 required by the decoder 48 to produce the remainder of the mark signals are also summarized in the chart.

As noted above, the block signal, guard signal and end signal developed in the decoder 48 are applied directly to the tape controller 33. The block end, block start, and data signal, however, are applied to the instruction selector 62, which will now be described with further reference to FIG. 2.

The instruction selector is constructed as a decoder, i.e. with a plurality of coincidence circuits each of which is arranged to produce an output signal only when it receives a selected input signal. In addition to the control signals from the decoder terminals 56–60, the instruction selector 62 receives a four-bit count from a counter 74.

The counter 74 has a reset input terminal 76, a shift and clear input terminal 78, and a shift and hold input terminal 80. It is reset to 1000 (binary) by the coincidence of the block signal from decoder output terminal 54 and the timing pulse TP0 at an AND circuit 82 whose output is connected to the reset terminal 76.

The counter shift signals are developed with an OR circuit 84 receiving the block end and block start signals from the decoder terminals 56 and 58. An AND circuit 86, which receives the timing pulse TP2 and the output signal from the OR circuit 84 energizes the shift and hold terminal 80. The output of the AND circuit 86 is also passed by a gate 88 to the shift and clear terminal 78, when the gate 88 is enabled by the block end signal.

With this arrangement, after the counter 74 is reset to 1000, a shift and hold signal, developed in response to a block start signal, will advance the counter content to 1100. A shift and clear signal, developed in response to a block end signal, will change the counter content to 0100.

Thus, as the block 24 of FIG. 1 passes under the transducer 44 in the forward direction 28, (FIG. 1), the counter 74 of FIG. 2, is reset to 1000 by the mark signal read from the block frame 22*a*. The counter is unchanged as the reverse guard frame 22*b* passes the read/write transducers. However, the next four frames 22*c*, 22*d*, 22*e* and 22*f* are block start frames and cause shift and hold signals to be applied to the counter. Accordingly, the count advances to 1100, 1110, 1111, and 1111 during the passage of the four block start frames. Further movement of the tape 10 in the forward direction 28 moves the data frames 22*g* under the read/write transducers. No shift signals are applied to the counter 74 in response to the mark track portions of the data frames and therefore the counter 74 remains at 1111. When the block end frame 22*f'* passes under the mark track read/write transducer 40, it causes a shift and clear signal to be applied to the counter, changing its count to 0111. The control signals produced by reading the mark track in the succeeding three block end frames 22*e'*, 22*d'* and 22*c'* also cause shift and clear signals to be applied to the counter, so that its count is successively changed to 0011, 0001 and finally to 0000. Thus, during the passage of each block, the counter 74 is first preset to 1000 by the block mark, advanced a digit at a time by the block start marks to 1111 and then shifted digit-by-digit by the block end marks to 0000.

It will thus be seen that the instruction selector 62 receives different counts from counter 74 as each block end frame and as each block start frame passes the mark track transducer 44. The selector 62 is connected to sense the simultaneous presence of a selected count in the counter and a selected one of the control signals it receives from the decoder 48, to develop different instruction signals which it applies to the tape controller 33.

In response to the signals it receives from the decoder 48 and the instruction selector 62, the tape controller schedules the writing and reading of data on the magnetic tape. For example, when it is desired that the data processing equipment 34 write information in a selected block along the tape, in response to an appropriate signal from the data processing equipment 34, the tape controller causes the tape transport 32 to move the tape in search of the selected block. The data equipment knows it has located the starting end of the selected block when it receives the number of the selected block from the data track transducer unit 38 simultaneously with receipt of a block signal from the tape controller.

In response to receipt of the control signals developed from reading other control words in the selected block, the tape controller then develops the signals that transfer the data from the data processing equipment to the data transducer unit 38.

As a further illustration of the use of the control signals, in response to a guard signal, developed from reading the digits in the mark track of the guard frame 22*b'* when the tape is moving in the forward direction, the tape controller turns off the write amplifiers for the data tracks to preclude obliteration of the block number information stored in the data portion of the succeeding two frames, i.e., the reverse block frame 22*a'* and the block frame of the next block.

Turning now to the transfer between the data processing equipment 34 and the magnetic tape 10 of data being processed, via the assembler 39, FIG. 2, and the data transducer unit 38, the sequence assembler 39 comprises a buffer register 90 and three shift registers 92, 94 and 96, one for each data track on the magnetic tape. Each shift register has a terminal 98 connected to one of the transducers 38*a*–38*c* and six terminals 100 connected to the buffer register 90. In addition, each shift register 92, 94 and 96 has a "shift forward" terminal 102 and a "shift reverse" terminal 104. The signals applied to these shift terminals are derived from the tape controller 33.

Internal to each of the shift registers 92–96, the terminal 98 thereof is connected through first a gating circuit to one end of the register of storage elements therein. The terminal 98 is also applied through an inverter circuit, to derive the complement of the signal at the terminal 98, and through a second gating circuit to the other end of the register. Also in each shift register the shift forward terminal 102 is internally connected to operate the first gating circuit and the shift reverse terminal 104 is connected to operate the other gating circuit.

The buffer register 90 is connected with the in-out element 37 of the data processing equipment 34 for parallel transfer of binary data between the sequence assembler and the in-out element.

During the writing of an 18 digit word (each frame having 18 slots in its data portion) on the magnetic tape 10, FIG. 1, the digits are transferred in parallel fashion from the in-out element 37 to the buffer register 90. The digits are then transferred in the same manner to the shift registers 92, 94 and 96, with each shift register receiving six digits of the word. When the tape is moving in the forward direction in FIG. 1, in response to each timing pulse TP1, the tape controller 33 delivers a signal to the shift forward terminals 102 of the shift registers 92–96. This causes one character to be sent from each shift register, at its serial terminal 98, to the data transducer to which it is connected. In this manner, in response to six successive TP1 timing pulses, the tape controller causes the sequence assembler 39 to send the six digits in each shift register 92–96 to the data transducers to be written on the tape in the proper sequence for the forward tape movement.

When on the other hand, the tape 10 is moving in the reverse direction, the word is written on the tape in exactly the same manner except that the tape controller 33 delivers shift reverse signals to the terminals 104 of the shift registers 92–96. As a result, the digits in each shift register 92–96 are sent to the data transducers and written on the tape 10 in the opposite sequence from when the tape is moving in the forward direction.

During the reading operation, when binary digits read from the magnetic tape are being transferred to the data processing equipment 34, the tape controller 33 controls the direction in which the successively read digits are transferred into the shift registers 92–96 from the data transducers 38*a*–38*c*. Thus, when the tape is moving in the forward direction the digits are assembled in the shift registers 92–96 in the opposite direction from that in which they are assembled when the tape 10 is moving in the reverse direction. After the word read from the tape is thus assembled in the shift registers 92–96, it is transferred to the buffer register 90 for subsequent parallel delivery to the in-out element 37.

The order in which successive words are delivered from the memory element of the data processing equipment 34, and conversely the order of the memory locations at which successive words are stored in the memory element may be changed in response to the tape direction.

This is appropriately done according to the program being processed, with the programmer signalling the computer in which order to select the memory addresses at which successive words are to be stored or, alternatively, read out.

The foregoing discussion has described the present invention with particular reference to a system wherein data can be read from and, alternatively, written on the tape while the tape is moving in either the forward or the reverse direction. However, the invention is also highly suited for use with data processing equipment that reads and writes information on the magnetic tape when it is moving in only one direction. In fact, many advantages of the invention, particularly the simplification of the equipment controlling the reading and writing of data on the tape, that stem from the present mark track format and decoding equipment are particularly apparent in such a unidirectional read/write system.

A unidirectional system can be represented in block form similar to the equipment shown in FIG. 2. One change is that the shift registers in the sequence assembler 39 only shift information in one fixed direction and hence there is no need for the tape controller to send tape direction signals to the shift registers receiving the signals produced from reading the data tracks.

According to one manner of operating a monodirectional read/write system, the data shift registers receive all the digits read from the data tracks, regardless of the tape direction. However, the contents of the shift registers are transferred to the data processing equipment 34 (FIG. 2) only when the tape is moving in the selected direction and when a control signal, usually the data signal, has been read from the mark track. The latter signal is used to indicate when a complete data word is assembled in the shift registers.

The information regarding the tape direction can be supplied either by the programmer, i.e., the program is written so that the tape direction in every read/write operation is known beforehand, or by an appropriate signal produced in the tape transport 32 (FIG. 2).

As noted above, the block number written in the block frames 22*a* and 22*a'* in each block are written in complement obverse forms in the two corresponding block frames within each block. This is particularly useful when the tape is used with monodirectional read/write equipment. The reason is that this arrangement of the block numbers on the tape enables the tape to move in either direction when it is desired to locate a single specified block.

For example, when the tape has been moved in the forward direction and it is then desired to locate a block that has already been passed, the tape is run in a reverse direction. Each time a block signal is sensed with the decoder 48 from the mark track in a reverse block frame 22*a'*, the data shift registers, corresponding to the shift registers 92, 94 and 96 shown in FIG. 2, will contain a block number read in the correct direction. In other words, when the tape is moving in the reverse direction, the shift registers receive the digits of the block number from the frame 22*a'* in the correct sequence. When, on the other hand, the tape is moving in the forward direction, they receive the same information in the correct sequence from the data tracks of frame 22*a*.

Thus, with the present invention, equipment capable of reading and writing data only when the tape is moving in one direction can nevertheless search the tape in both directions.

Considering again the format of the control words in the mark track 18, FIG. 1, each data word is the complement obverse of itself. Moreover, when the tape is read in the forward direction, the first data frame 22*g* follows the block start frame 22*f*, whereas succeeding data frames all follow data frames.

As discussed above, the decoder 48 only develops the data signal when the eight digits stored in the shift register 46 conform to a selected sequence as set forth in FIG. 3. However, as set forth in row 2, column I, in the chart of FIG. 4, the last two digits of a data mark plus a complete data mark are identical to the last two digits of a block start mark plus a full data mark. Thus, with the mark track format of the present invention, the shift register 46 contains the same sequence of eight digits when a data frame is read in the forward direction following both the block start frame and another data frame.

Correspondingly, when the tape 10 is moving in the reverse direction, a data frame is read following a block end frame or following another data frame. This is summarized in row 2, column III.

Column II of FIG. 4, which sets forth the complement obverse of the mark words in column III, reveals in row 2 that the complement obverse of either combination of eight digits set forth in row 2, column III, is identical to the two identical eight-digit combinations in column I, row 2.

Thus, examination of row 2 in FIG. 4 also reveals that the data marks, the block start marks and the block end marks are so selected that the same sequence of digits results when any data frame is read in the forward direction or in the reverse direction.

As indicated in row 1 of FIG. 4, a tape end frame 22*h*, FIG. 1, is read in the forward direction immediately following either a reverse block frame or a tape end frame. In the reverse direction, the reverse tape end frame is read following either a forward block frame or another reverse tape end frame. Again, however, as revealed by comparing columns I and II, the eight digits accumulated in the shift register stages 46*a* through 46*h* (FIG. 2) in either of these events are identical, regardless of whether the tape is moving in the forward or the reverse direction. This result again stems directly from the format of digits selected for the mark track words.

Turning now to row 3 of FIG. 4, the forward block frame occurs only once in each block, as contrasted with the data frames which, as just noted, occur more than once in each block. Thus, when a forward block frame is read in the forward direction it follows immediately after a reverse block frame and when the tape is read in the reverse direction, the reverse block frame immediately follows a forward block frame. Again, as revealed by comparing columns I and II, the FIG. 2 shift register 46 will have the same series of eight digits when a forward block frame is read in the forward direction as when a reverse block frame is read in the reverse direction.

Considering now the block start mark word and its complement obverse, the block end word, when the recording tape moves in the forward direction, the first block start frame 22*c*, FIG. 1, follows the reverse guard frame 22*b* and the other block start frames 22*d*–22*f* follow block start frames. The two possible sequences of eight digits stored in the shift register 46 after a block start frame has been read are set forth in column I, row 5, of FIG. 4.

When the tape is moving in the reverse direction, the first block end frame 22*c'* to be read follows the guard frame 22*b'*, and the successive block end frames 22*d'*–22*f'* follow other block end frames. Thus, in the shift register 46 there will be one of the two sequences of eight digits set forth in column III, row 5. The complement obverse of the column III, row 5, sequences are set forth in column II of this row and will be seen to correspond to the two corresponding sequences of digits developed when the block start frames are read in the forward direction.

Thus, the first block start or block end frame read in each block when the tape moves in the forward or reverse direction, respectively, produces a different sequence of eight digits than the other block end frames read in the forward direction or the other block end frames read in the reverse direction. The illustrated decoder 48 develops the block start signal in response to either of these two eight-digit sequences. However, the decoder 48 could alternatively be constructed to develop a signal indicating or identifying the first block start frame and then develop a different signal identifying the other three block start frames.

The mark track format and the mark track decoding apparatus described above provide a tape controller and other data processing equipment with substantially continuous information regarding the tape locations in position to have information written on the tape and read from it. The invention not only provides signals identifying each block and frame moving into read/write position, but also makes it possible to read or write a single word in a selected slot along the moving tape.

This mark track information automatically results with equal precision and rapidity when the tape is moving in either the forward or the reverse direction.

Moreover, the data transfer apparatus for operation with the mark track system described above assembles digits read from the tape in the proper sequence for transfer to the data processing equipment with relatively simple and low cost equipment operating in conjunction with the tape controller.

Although the invention has been described with reference to a magnetic tape storage medium, in principle it relates to moving data storage media in general, including tapes and disks, having a large number of successively accessible storage locations.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention described herein, and all statements of the scope of the invention, which as a matter of language, might be said to fall therebetween.

Having described the invention, what is claimed as new and secured by Letters Patent is:

1. In digital data processing apparatus, the combination comprising (A) a record medium
  (1) arranged with at least a mark track and a separate data track,
  (2) having at least first and second selectively-positioned control locations thereon in said mark track,
  (3) having recorded in said mark track at said control locations first and second digital control words comprising such a series of digits that when the digits of the first control word are read in a forward direction and the digits of the second control word are read in the opposite reversed direction the same first multiple-digit mark track signal results, (B) record reading means
  (1) arranged to read from said first and second control locations when movement of said record medium relative to said reading means moves the control location through said reading means, and
  (2) producing a multiple-digit signal in response to each control word it reads, and (C) decoding means
  (1) receiving said mark track signal, and
  (2) normally developing at least one control signal in response to said first mark track signal.

2. A claim in accordance with claim 1 in which (A) the digits constituting said control words are recorded according to the Manchester type phase modulated technique, and (B) one of said control words is the complement obverse of the other.

3. Apparatus according to claim 2 in which said digital control words are selected from the group consisting of the following words and the complement obverse of each:

| | |
|---|---|
| 101101 | 01101101 |
| 010110 | 10010110 |
| 101001 | 01010110 |
| 001000 | 11101001 |
| 111000 | 10001000 |
| | 00001000 |
| | 00111000 |

4. In digital data processing apparatus, the combination comprising (A) first record reading means for reading digital characters on a record medium and developing signals in response thereto, (B) second record reading means for reading digital characters on a record medium and producing digital signals in response thereto, (C) record transport means for selectively moving a digital record medium in a forward direction and, alternatively, in the opposite reverse direction with respect to said first and second reading means, and (D) control means
  (1) connected to receive digital signals from said second reading means in a character by character sequence in the order in which said digital signals are produced, and
  (2) producing an output signal only in response to a digital signal corresponding to a series of digital characters whose complement obverse corresponds to the same digital signal.

5. Apparatus according to claim 4 further comprising shift register means (A) receiving the signals developed by said first reading means, and (B) shifting digital information received from said reading means in a single direction.

6. Apparatus according to claim 4 further comprising timing means producing timing signals synchronized with the movement of the record medium by said transport means and applying said timing signals to said control means.

7. Apparatus according to claim 4 further comprising shift register means (A) receiving the signals developed by said first reading means, and (B) operable to shift the digital information received from said first reading means in one of two opposite directions.

8. Apparatus according to claim 7 in which (A) said record transport means develops a direction signal corresponding to the direction in which it is moving the record medium, and (B) said shift register means receives said direction signal and shifts information input thereto according to the direction of transport movement as communicated by said direction signal.

9. Mark track control signal apparatus comprising in combination (A) a record reading means for reading multidigit words in both the forward and reverse directions from at least a first channel of a moving record medium having first and second channels and developing a binary signal in accordance therewith, said reading means being adapted to provide the same binary signal when portions of said first channel are read in a first direction as when corresponding portions are read in a second direction opposite to said first direction, (B) first decoder means
(1) receiving the binary signal from said reading means,
(2) having at least first and second output terminals,
(3) energizing each of said output terminals with first and second control signals, in response to receipt of different multiple digit binary signals from said reading means,
(C) binary counting means
(1) connected with said first and second decoder output terminals to change the count therein in response to energization of said first and second output terminals,
(D) second decoder means
(1) having input terminals connected to said first and second terminals,
(2) having further input terminals connected to receive the binary count in said counting means,
(3) developing output signals in response to selected combinations of said first and second control signals and different binary counts of said counting means.

10. Apparatus according to claim 9
(A) in which said first decoder means has a third output terminal at which it develops a third control signal,
(B) said counting means being connected with said third terminal and normally being conditioned to a selected count in response to said third control signal.

11. Apparatus according to claim 9
(A) in which said first decoder means has a third output terminal at which it develops a third control signal,
(B) further comprising a timing circuit producing a repetitive series of at least first and second timing pulses synchronized with the movement of the record medium,
(C) in which said counting means comprises
(1) a shift register having
(a) a shift and clear input terminal
(b) a shift and hold input terminal, and
(c) a reset input terminal, said shift register establishing a selected count therein in response to a signal at said reset input terminal,
(2) a first coincidence circuit
(a) having a pair of input terminals connected respectively to said third terminal of said first decoder means and to said timing circuit to receive said first timing pulse,
(b) the output terminal from said first coincidence circuit being applied to said shift register reset terminal,
(3) an OR circuit
(a) having a pair of input terminals connected respectively to said first and second output terminals of said first decoder means, and
(b) having an output terminal,
(4) a second coincidence circuit
(a) having a pair of input terminals connected respectively to said output terminal of said OR circuit and to said timing circuit to receive said second timing pulse, and
(b) having an output terminal connected to said shift register, and
(5) a third coincidence circuit
(a) having a pair of input terminals connected respectively to said output terminal of said second coincidence circuit and to said first output terminal of said first decoder means, and
(b) having an output terminal connected to said shift and clear input terminal of said shift register.

12. In the machine storage of digital data on a record medium, the steps of
(A) organizing said record medium into blocks of storage locations,
(B) recording in a first track on said medium in at least a first block at least a pair of first and second mark words selectively located within said first block, said pair of mark words each comprising a sequence of digits so selected that the signal developed from reading said first mark word in a forward direction is identical to the signal developed from reading said second mark word in the reverse direction,
(C) producing a control signal both in response to the signal developed from reading said first mark word in said forward direction and in response to reading said second mark word in said second direction,
(D) controlling the transfer of data between a second track on said record medium and data storage means with said control signal, and
(E) assembling the sequence of the digits of said data being transferred according to the direction in which said record medium is moving.

13. A claim according to claim 12 in which the digits of said pair of mark words are recorded according to the phase modulated technique in which said first mark word is the complement obverse of said second mark word.

14. A method according to claim 13 in which said digital information transferring step further comprises the steps of
(A) assembling in mark track register means in sequences of (*m*) digits the successive digits read from said first track, and
(B) developing said control signal in response to selected sequences of (*m*) digits in said mark track register means, said selected sequences comprising (*n*) digits read in a single frame from said mark track plus at least one additional digit read from said mark track in a frame contiguous to said single frame from which said (*n*) digits are read.

15. A method according to claim 14 in which said additional digits and said (*n*) digits that comprise such selected sequences of digits in said mark track register means are read in immediate succession.

References Cited

UNITED STATES PATENTS

| | | | |
|---|---|---|---|
| 3,146,429 | 8/1964 | Laurer et al. | 340—174.1 |
| 3,016,522 | 1/1962 | Lourie et al. | 179—100.2 |
| 2,969,525 | 1/1961 | Hill | 340—174.1 |

BERNARD KONICK, *Primary Examiner.*

A. I. NEUSTADT, *Assistant Examiner.*

UNITED STATES PATENT OFFICE
CERTIFICATE OF CORRECTION

Patent No. 3,387,293

June 4, 1968

Thomas C. Stockebrand

It is certified that error appears in the above identified patent and that said Letters Patent are hereby corrected as shown below:

Column 3, line 68, "term" should read -- form --. Column 4, line 8, "their" should read -- these --; line 27, "marks" should read -- mark --. Column 5, line 7, "and," should read -- and --; line 40, "accuracy, two additional digits" should read -- accuracy --. Column 6, line 62, after "and" insert -- tape --.

Signed and sealed this 1st day of September 1970.

(SEAL)
Attest:

Edward M. Fletcher, Jr.
Attesting Officer

WILLIAM E. SCHUYLER, JR.
Commissioner of Patents